Figure 11:
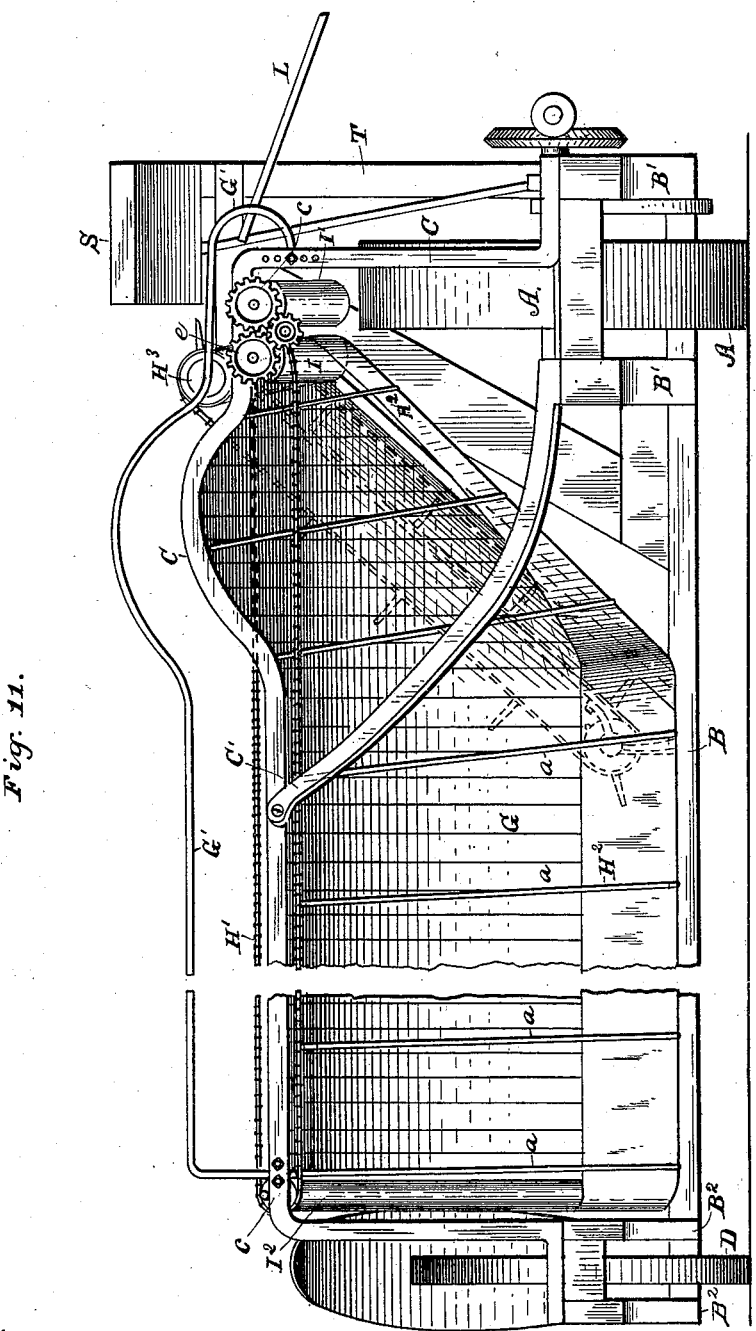

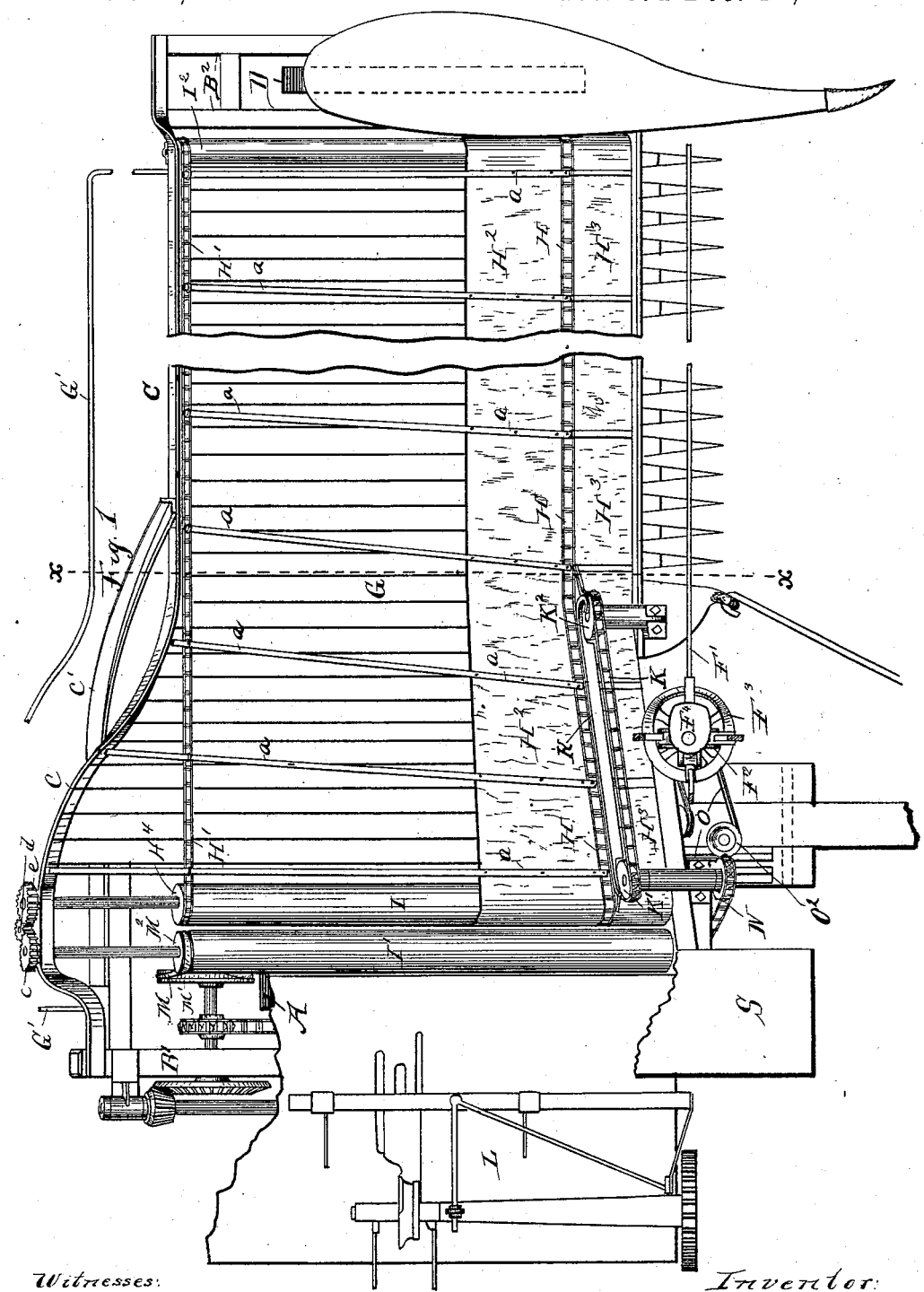

(No Model.) 4 Sheets—Sheet 2.
W. W. BURSON.
HARVESTING MACHINE.
No. 595,369. Patented Dec. 14, 1897.
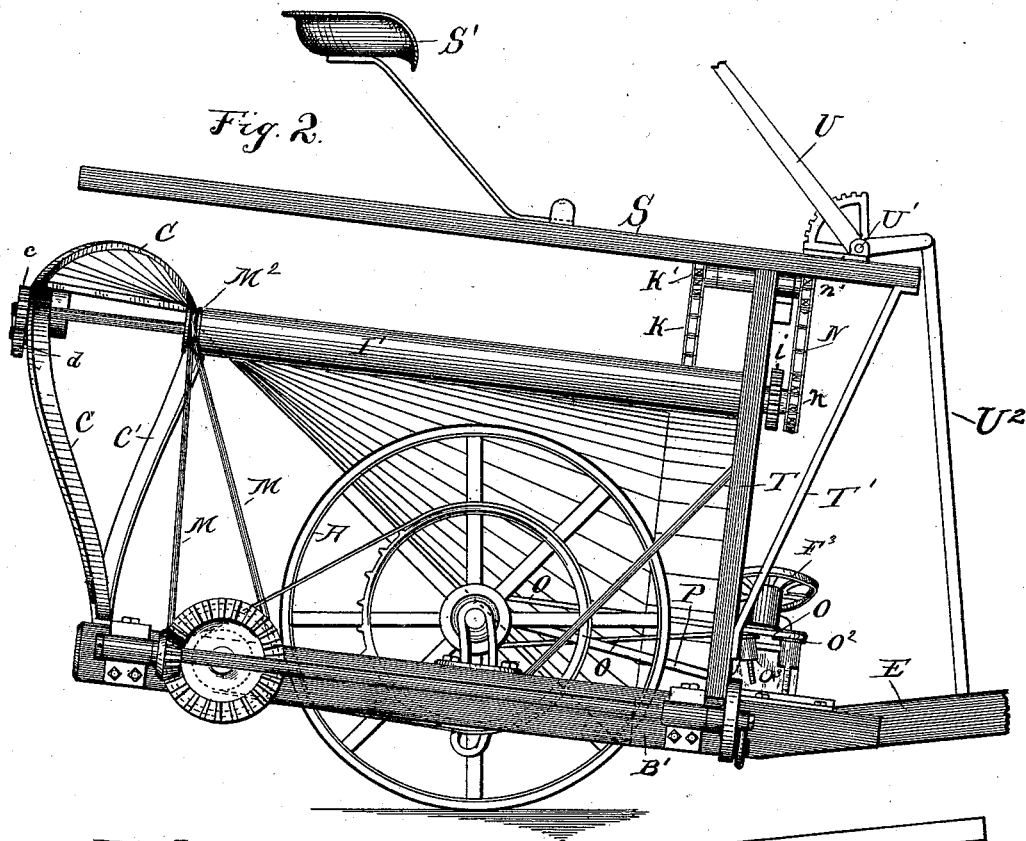
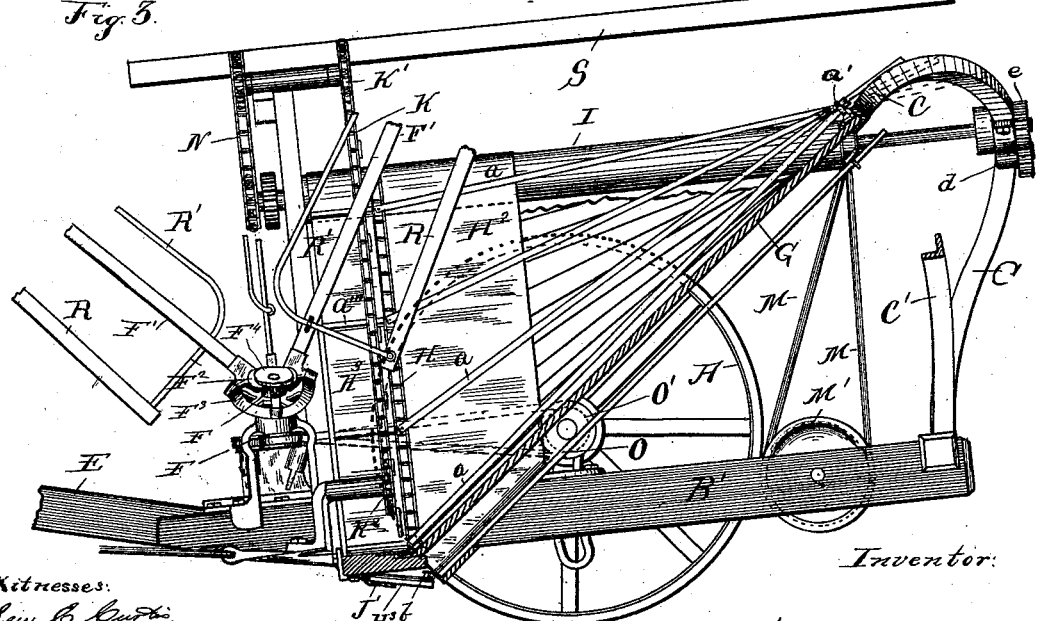
Witnesses:
Lew. C. Curtis
Edmund Adcock
Inventor:
William Worth Burson.

(No Model.) 4 Sheets—Sheet 3.
W. W. BURSON.
HARVESTING MACHINE.
No. 595,369. Patented Dec. 14, 1897.
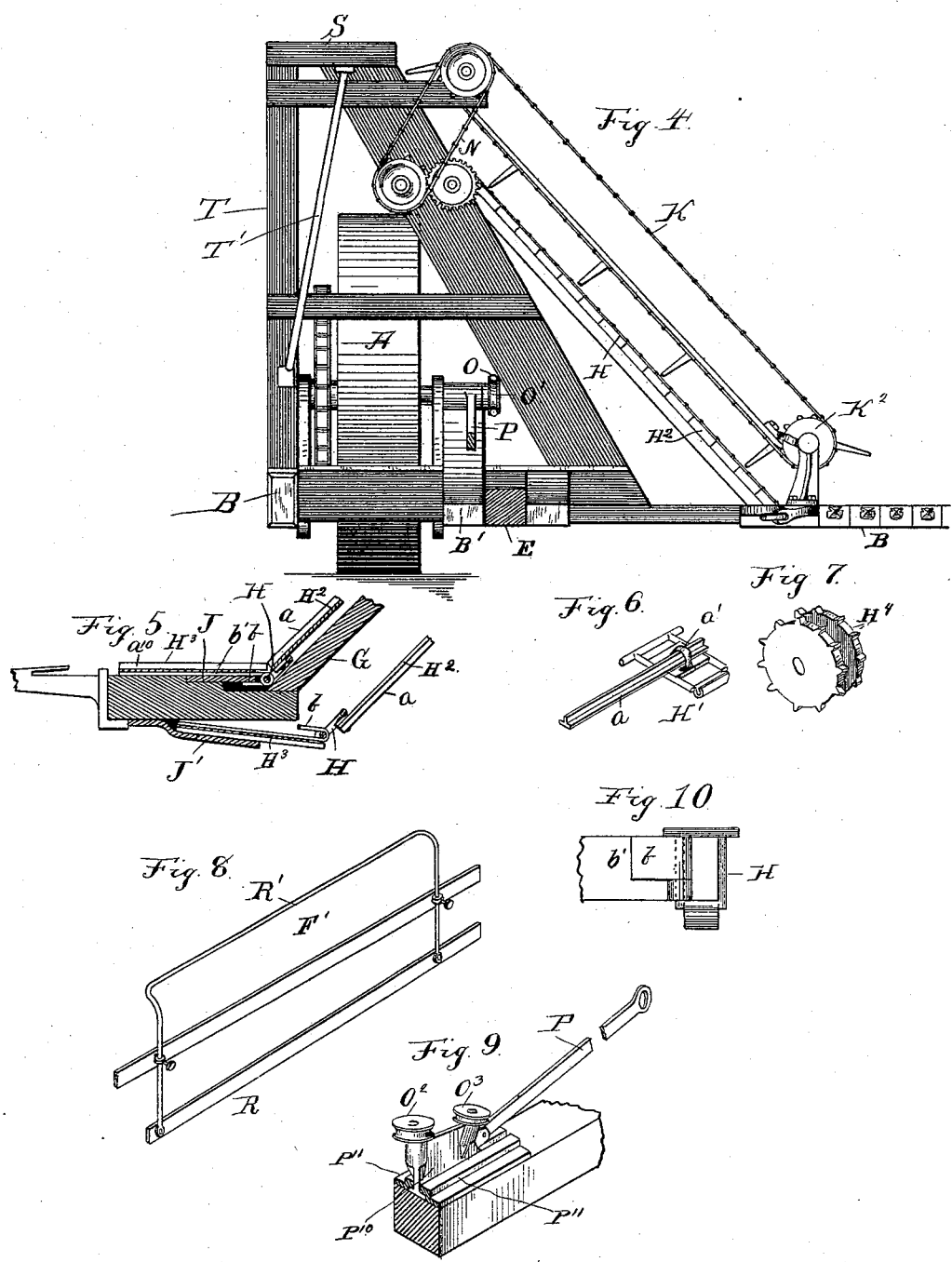

(No Model.) 4 Sheets—Sheet 4.

W. W. BURSON.
HARVESTING MACHINE.

No. 595,369. Patented Dec. 14, 1897.

Attest.
Victor J. Evans.
Saml. J. Wallace

Inventor.
William Worth Burson

UNITED STATES PATENT OFFICE.

WILLIAM WORTH BURSON, OF CHICAGO, ILLINOIS.

HARVESTING-MACHINE.

SPECIFICATION forming part of Letters Patent No. 595,369, dated December 14, 1897.

Application filed October 24, 1887. Serial No. 253,192. (No model.)

*To all whom it may concern:*

Be it known that I, WILLIAM WORTH BURSON, a citizen of the United States, residing at Chicago, in the county of Cook and State of Illinois, have invented certain new and useful Improvements in Harvesting-Machines, of which the following is a specification.

My invention relates to improvements in self-binding harvesters having especial adaptation to the cutting and binding of corn or other tall and heavy grain; and the objects of my improvements are, first, to provide a harvester-frame of unusual strength and stiffness for the amount of material used; second, to provide an inclined receiving-platform and carrying mechanism, whereby the grain is handled better than on the level platform; third, to provide an elevating device adapted to raise either long or short grain with less labor and less loss from shelling grain than with other machines; to provide a reeling device adapted to handle long or short grain, and to construct a machine so as to accommodate and render practical the aforementioned improvements. I attain these objects by the mechanism illustrated in the accompanying drawings, in which—

Figure 1 is a plan view of my harvester, some parts being broken away to show others. Fig. 2 is a side elevation from drive-wheel side. Fig. 3 is a sectional elevation on the line $x\ x$, Fig. 1, looking toward the drive-wheel. Fig. 4 is a front elevation of parts in Fig. 3, showing elevating apparatus. Fig. 5 is a detail section of finger-bar and the elevating apparatus. Fig. 6 shows one link of the elevating-chain H' with the cross-bar $a$. Fig. 7 shows a sprocket-wheel for operating the chain H'. Fig. 8 shows one of the reel-arm frames. Fig. 9 shows the chain-guide. Fig. 10 shows a link of the chain H with the part $b'$ attached. Fig. 11 is a back view of the machine, part being broken away.

The harvester is supported on the drive-wheel A and grain-wheel D in the usual manner. The frame-pieces B' B', one on each side of the master-wheel, have their front ends fastened to the finger-bar B and their rear ends fastened firmly together. The bar C is bent upward from its attachment to the outer piece B', so as to support the rear end of the upper elevator-roller I, and extending across the rear side of the harvester is bent downward and is attached to the grain-wheel frame-pieces $B^2\ B^2$, one of which pieces is placed on each side of the grain-wheel, its front end fastened to the finger-bar B, as is usual. The brace-piece C' is fastened to the rear end of the inner frame-piece B' and extends upward to bar C, to which it is fastened, thereby strengthening the frame, Fig. 1.

The tongue E is fastened to the harvester in the usual way and the knife or sickle driven in the usual manner and need not be further described here.

The reel consists, substantially, of what is known as the "self-rake" element, except in sweeping the grain from the platform, and has the rake-head F pivoted vertically in a support fastened to the finger-bar. To this head are pivoted the reel-arms F' at $F^2$, and the guiding cam-track $F^3$ under said arms and the cam-plate $F^4$, placed above them, determine the horizontal plane in which the reel-arms shall move when revolved.

The grain-receiving platform G is elevated at an angle of about forty-five degrees, beginning a short distance back of the finger-bar and extending rearward and upward to about the height of the top of the elevator. This construction of the receiving-platform furnishes a narrow level space back of the finger-bar on which the butts of the grain can move and an upward-inclined space on which the body of the grain can be carried.

At the rear of the receiving-platform and in line with its inclined surface is placed the back bar G', fastened adjustably in position, and adapted to support the tops of long grain or of corn and to save the expense of making a wide receiving-platform, which would be otherwise necessary. (See Fig. 1.)

The carrying and elevating mechanism consists of the chain H, which moves at the foot of the inclined part of the platform and to which are attached the rods $a$ and the narrow canvas $H^2$ on the rearward edge of the chain and the canvas or belt $H^3$ on its front edge, on which are the cleats $a^{10}$, which operate to hold the belt extended and the better to carry the butts of the grain, the chain H', which moves along the upper rear portion of the platform and has a loop through which the rods $a$ can move endwise, and the chain K, adapted to engage the upper side of the butts of the grain. The canvas-support J' has its front edge fastened to the under edge of the finger-bar, and the groove thus formed makes a safe passage-way for the return of the carrier H³ under the platform. The carrying-chains H and H' are driven from sprocket-wheels placed upon the roller I, which is supported in suitable bearings at the upper part of the elevator. The grain ends of the chains H and H' run over a roller I², placed at that end of the receiving-platform. The manner of giving movement to these chains will be described farther on.

The rear side of the receiving-platform is substantially horizontal and raised to the height of the top of the elevator, and chain H' extends from roller I to the roller at the grain end of the platform. Chain H follows the line of the finger-bar until it has passed the cutting apparatus, when it is inclined upward to the top of the elevator. (See Figs. 1 and 3.) Chain H is kept down in line with the finger-bar by means of the hooks $b$, attached to said chain, which pass under the flange J of the finger-bar. (See Fig. 5.) The distance between the chains H and H' at the foot of the elevator is represented by the hypotenuse of a right angle and at the top of the elevator by a side of the same, and hence the distance between the chains is less at the top of the elevator than any place along the line of the finger-bar.

The rods $a$ are fastened to chain H and pass through a loop in the link of chain H', which construction permits the rods to have an endwise movement through said chain and at the top of the elevator to extend rearward beyond the chain, Figs. 1 and 6. The grain, when elevated, passes over roller I and is moved toward the binder by roller I', placed parallel with roller I, Fig. 1.

I prefer to construct my harvester with a belt or narrow canvas fastened to the front edge of the chain H, which is conveniently done by securing it to the extension $b'$ of the hook-piece $b$ and another canvas to the rear edge of the chain, which is conveniently done by fastening the said canvas to the rods $a$. These canvases assist in carrying the butts of the grain when long or in carrying very short grain better than the chain and rods without the canvas.

The hooked connection of the belt H³ with the chain permits it to assume the relative angles with the main part of the carrier seen in Figs. 1 and 5, in which it is kept in line with the finger-bar in both the upper and lower sides of the same as it is carried around.

The upper elevator-chain K is placed upon the sprocket-wheel K', the supporting-shaft of which is held in suitable bearings at the upper side of the elevator, and the lower end runs on the sprocket-wheel K², which runs on a stud held near the foot of the elevator. The chain is adapted to engage the butts of the grain and to assist in elevating them.

The inclination given to the belt H³ in relation to the rod $a$, as shown on the under side of the finger-bar, enables a thinner platform and finger-bar to be used than can be had without the hinged belt, which is desirable when cutting close to the ground. (See Fig. 5.) By this arrangement of the carrying mechanism the tops of long grain and of corn do not require elevating, being prevented from falling lower than is desired, and the butts alone require raising.

I do not confine myself to the particular construction of the carrying and elevating devices, variations of which will suggest themselves to the skilled mechanic, to be determined by the particular uses and circumstances in different cases.

The sickle and binder are driven in the usual manner and need not be described here.

The carrying and elevating mechanism is run by the quarter-twist cable M or belt from the pulley M', placed on the harvester bevel-gear shaft, to the pulley M² on the roller I'. Spur-gear $c$ on roller I' meshes into the intermediate gear $d$, which meshes into gear $e$ on roller I, giving the proper motion to the roller I. (See Figs. 1 and 2.) Carrying-chain K is driven by chain N.

The reel-arm F' has a bat R attached to it adjustably by the bail R', which extends above the arm and is bent forward of the bat to cause the stalks to fall onto the platform G when cut. The bail R' is fastened to the reel-arm F by eyebolts or staples, by loosening which the bat is readily raised or lowered in its relation to the reel-arm. (See Figs. 3 and 8.)

The reel-head F is driven by a band or chain O from sheave O' on drive-wheel A to the sheave F⁵ on the reel head or shaft. This band passes about the sheaves O² and O³, carried on the slide P¹⁰, which moves between the guides P¹¹, the radius-bar P being connected at one end to the axle of wheel A and the other end to the slide P¹⁰, whereby the pulleys are kept an equal distance from the driving-wheel, and hence the chain taut without regard to the changed elevation of the driving-wheel.

The seat-board S, supporting seat S', is fastened upon the upright frame T at the front end of the elevator, to the front end of which seat-board, projecting forward of the frame, the brace T' is fastened. (See Figs. 2 and 4.) No rear support is admissible to the seat-support, as the material to be cut is too long to pass such rear brace, but side bracing which does not interfere with the passage of the grain may be had.

The tilting lever U is of the usual form and does not require special explanation. This lever is pivoted on pins U', having a sector of the well-known form, with a spring-bolt engaging with it. The front end is hinged to bar U², which is pivoted to the tongue E.

The chain H is made, preferably, so as to use a central-toothed sprocket-wheel, while chain H' should have operating lugs or pintles outside of the link and a double-flange wheel H⁴ to operate it, Figs. 7 and 10. These lugs (shown on the corners outside the links, Figs. 6 and 10) rest on the flanges of the wheel H⁴ to support the chain which runs over the space in the center of wheel H⁴, as shown in Fig. 7.

The chain H' is shorter than chain H, so it has to run correspondingly slower so the bars $a$ will be very nearly in parallel vertical planes at the rollers on opposite sides of the platform. This result is reached by making the chains with the same number of links, but those of chain H' shorter, and the driving-sprocket on roller I of the same number of teeth, but the rear one, on which chain H' runs, will be of less diameter than that on which chain H runs.

In operation the machine is drawn forward in the usual manner. The reel-arms being properly guided by the cam F³ and given motion by chain O, as already described, gather the grain to the cutting apparatus and when cut lay it upon the inclined receiving-platform and is then raised by the cam F³, while the carriers move the cut grain along the platform, the butts resting upon the belt H³, and the tops, if long, upon chain H' or beyond on rod G', until the end of the cutting apparatus is reached, when the upward incline of the carrier, aided by the action of chain K, elevates the grain and delivers it upon the binder-decks to be bound and thrown upon the ground or thrown on a sheaf-carrier and delivered in bunches, as may be desired.

Various modifications can be made upon the details of my machine without going beyond the scope of my present invention.

What I claim as my invention is—

1. A harvester-frame having a finger-bar connected to the master-wheel frame at one end and to the grain-wheel frame at the other end, a rear bar fastened at one end to the master-wheel frame, then bent upward to the height of the elevator, then bent to a horizontal position and extended to the grain-wheel side, then bent downward to and fastened on said grain-wheel frame, a brace fastened to the master-wheel frame and bent upward to said rear bar, in combination with a cutting and elevating mechanism, substantially as set forth.

2. The combination of an elevator and a grain-receiving platform the rear side of which is raised about to the height of the elevator, the front side being on a level with the cutting apparatus back to the foot of the elevator and then inclined upward so as to permit the cut product to be passed over the master-wheel, and mechanism for elevating such cut product to a level to pass over such wheel, and for operating such elevator.

3. The combination of a cutting apparatus, a conveyer and a rod fastened adjustably to the harvester-frame and extending back of and across the length of the conveyer, whereby the rod may be moved back and forth to support the tops of the grain, substantially as specified.

4. A grain-conveying mechanism formed of a front and a rear chain and cross-bars connecting from one to the other chain, the front chain being longer than the rear chain and moving in the plane of the cutting apparatus to the end of the cutting mechanism and then inclined upward so as to deliver the cut grain over the master-wheel, and the rear chain extending horizontally to an upper elevator-roller from the grain-wheel side, combined with an operating mechanism, substantially as set forth.

5. The combination of a cutting apparatus, a grain-conveying mechanism, the front side of which is in the plane of the cutting apparatus and the rear side on a level with the top of the elevator, and an elevator, whereby the grain is cut and conveyed to the elevator and the butts raised to the height of the tops and all passed over the master-wheel, substantially as described.

6. A grain-conveying mechanism formed of two parts jointed in line of their movement near the front edge, the front part adapted to move in the plane of the finger-bar and the rear edge inclined upward toward the plane of the top of the elevator, and an elevator, whereby the tops of the grain are held from falling to the horizontal plane, and the butts of the grain furnished a horizontal support while being moved toward the elevator, substantially as specified.

7. A grain-conveying mechanism formed of a front and rear chain, cross-bars connecting the two chains, a belt or narrow canvas attached to the front chain and extending forward from it toward the cutting apparatus, and a wider portion extending rearward at an upward inclination, whereby the grain shall be conveyed toward the elevator, substantially as set forth.

8. A grain-conveying mechanism inclined upward at the rear to the height of the elevator, an elevator adapted to engage the butts below and above and to raise them over the master-wheel, substantially as specified.

9. The driver's seat attached to a support which extends backward over the elevator and is fastened on the front upright frame, without any rear support, provided with a brace-support in front of said fastening, whereby an unobstructed passage-way is permitted to the grain under and rearward of the seat, substantially as set forth.

WILLIAM WORTH BURSON.

Witnesses:
 EDMUND ADCOCK,
 LEW. E. CURTIS.